US010181966B1

(12) United States Patent
Sun et al.

(10) Patent No.: US 10,181,966 B1
(45) Date of Patent: Jan. 15, 2019

(54) WIFI CLASSIFICATION BY PILOT SEQUENCES

(71) Applicant: Marvell International Ltd., Hamilton (BM)

(72) Inventors: Yakun Sun, Sunnyvale, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/143,075

(22) Filed: Apr. 29, 2016

Related U.S. Application Data

(60) Provisional application No. 62/156,076, filed on May 1, 2015, provisional application No. 62/218,309, filed on Sep. 14, 2015.

(51) Int. Cl.
*H04L 25/02* (2006.01)
*H04L 5/00* (2006.01)
*H04W 84/12* (2009.01)

(52) U.S. Cl.
CPC ........ *H04L 25/0222* (2013.01); *H04L 5/0007* (2013.01); *H04L 5/0048* (2013.01); *H04W 84/12* (2013.01)

(58) Field of Classification Search
CPC .. H04L 25/0222; H04L 5/0007; H04L 5/0048
See application file for complete search history.

(56) References Cited

U.S. PATENT DOCUMENTS

| 6,553,534 | B2 | 4/2003 | Yonge, III et al. |
| 6,856,590 | B2 | 2/2005 | Okada et al. |
| 7,046,746 | B1 | 5/2006 | Keaney et al. |
| 7,478,314 | B1 | 1/2009 | Cheong et al. |
| 7,558,537 | B2 | 7/2009 | Trachewsky et al. |
| 7,577,210 | B2 | 8/2009 | Lee |
| 7,599,332 | B2 | 10/2009 | van Zelst et al. |
| 7,742,390 | B2 | 6/2010 | Mujtaba |
| 7,773,565 | B2 | 8/2010 | Hansen et al. |
| 7,889,707 | B2 | 2/2011 | Niu et al. |

(Continued)

FOREIGN PATENT DOCUMENTS

| WO | WO-2006/025996 | 3/2006 |
| WO | WO-2008/046163 | 4/2008 |

(Continued)

OTHER PUBLICATIONS

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

(Continued)

*Primary Examiner* — Lakeram Jangbahadur

(57) ABSTRACT

A communication device determines a format according to which a data unit is to be generated, and selects a pilot sequence to be used for generating the data unit. The pilot sequence is selected from a plurality of pilot sequences corresponding to a plurality of data unit formats, and the pilot sequence is selected based on the determined format. The communication device generates the data unit to include the selected pilot sequence, and transmits the data unit.

20 Claims, 8 Drawing Sheets

(56) References Cited

U.S. PATENT DOCUMENTS

| | | | |
|---|---|---|---|
| 7,904,519 B2 | 3/2011 | Czotscher et al. | |
| 7,961,593 B2 | 6/2011 | Porat et al. | |
| 7,974,225 B2 | 7/2011 | Kasher | |
| 8,144,647 B2 | 3/2012 | Nabar et al. | |
| 8,155,138 B2 | 4/2012 | van Nee | |
| 8,201,065 B1 | 6/2012 | Cheong et al. | |
| 8,289,869 B2 | 10/2012 | Sawai | |
| 8,310,981 B2 | 11/2012 | Damnjanovic et al. | |
| 8,339,978 B2 | 12/2012 | Sawai et al. | |
| 8,369,301 B2 | 2/2013 | Cai | |
| 8,494,089 B2 | 7/2013 | Aoki et al. | |
| 8,526,351 B2 | 9/2013 | Fischer et al. | |
| 8,532,077 B2 | 9/2013 | Stacey et al. | |
| 8,599,804 B2 | 12/2013 | Erceg et al. | |
| 8,619,907 B2 | 12/2013 | Mujtaba et al. | |
| 8,627,171 B2 | 1/2014 | Pi | |
| 8,681,757 B2 | 3/2014 | Lee et al. | |
| 8,718,021 B2 | 5/2014 | Yu et al. | |
| 8,724,720 B2 | 5/2014 | Srinivasa et al. | |
| 8,737,189 B2 * | 5/2014 | Hansen | H04B 7/02 370/203 |
| 8,867,653 B2 | 10/2014 | Zhang et al. | |
| 8,873,680 B2 | 10/2014 | Zhang | |
| 8,885,740 B2 | 11/2014 | Zhang et al. | |
| 8,948,283 B2 | 2/2015 | Zhang | |
| 8,953,696 B2 | 2/2015 | Stoye | |
| 8,982,889 B2 | 3/2015 | Zhang | |
| 9,131,528 B2 | 9/2015 | Zhang et al. | |
| 9,209,837 B1 | 12/2015 | Cheong et al. | |
| 9,258,178 B2 | 2/2016 | Zhang | |
| 9,350,583 B2 | 5/2016 | Zhang | |
| 2002/0003773 A1 | 1/2002 | Okada et al. | |
| 2002/0188908 A1 | 12/2002 | Yonge et al. | |
| 2003/0056043 A1 | 3/2003 | Kostadinov | |
| 2004/0179627 A1 | 9/2004 | Ketchum et al. | |
| 2006/0034384 A1 | 2/2006 | Lee | |
| 2006/0176966 A1 | 8/2006 | Stewart et al. | |
| 2006/0182017 A1 | 8/2006 | Hansen et al. | |
| 2007/0183523 A1 | 8/2007 | Koo et al. | |
| 2008/0299962 A1 | 12/2008 | Kasher | |
| 2009/0086699 A1 | 4/2009 | Niu et al. | |
| 2009/0122771 A1 | 5/2009 | Cai | |
| 2009/0190465 A1 | 7/2009 | Porat et al. | |
| 2009/0196163 A1 | 8/2009 | Du | |
| 2010/0034323 A1 | 2/2010 | Stoye | |
| 2010/0046358 A1 | 2/2010 | van Nee | |
| 2010/0046656 A1 | 2/2010 | van Nee et al. | |
| 2010/0091673 A1 | 4/2010 | Sawai et al. | |
| 2010/0091675 A1 | 4/2010 | Sawai | |
| 2010/0103920 A1 | 4/2010 | Damnjanovic et al. | |
| 2010/0202301 A1 | 8/2010 | Wen et al. | |
| 2010/0260159 A1 | 10/2010 | Zhang et al. | |
| 2010/0309834 A1 | 12/2010 | Fischer et al. | |
| 2011/0002219 A1 | 1/2011 | Kim et al. | |
| 2011/0032875 A1 | 2/2011 | Erceg et al. | |
| 2011/0110348 A1 | 5/2011 | Lee et al. | |
| 2011/0122846 A1 | 5/2011 | Yu et al. | |
| 2011/0271169 A1 | 11/2011 | Pi | |
| 2012/0170563 A1 | 7/2012 | Abraham et al. | |
| 2012/0195391 A1 | 8/2012 | Zhang et al. | |
| 2012/0201316 A1 | 8/2012 | Zhang et al. | |
| 2012/0236971 A1 | 9/2012 | Taghavi Nasrabadi et al. | |
| 2012/0294268 A1 | 11/2012 | Lee et al. | |
| 2012/0294294 A1 | 11/2012 | Zhang | |
| 2012/0294392 A1 | 11/2012 | Zhang | |
| 2012/0300874 A1 | 11/2012 | Zhang | |
| 2012/0327871 A1 | 12/2012 | Ghosh et al. | |
| 2013/0202001 A1 | 8/2013 | Zhang | |
| 2013/0259017 A1 | 10/2013 | Zhang et al. | |
| 2013/0266083 A1 | 10/2013 | Baik et al. | |
| 2014/0337690 A1 | 11/2014 | Zhang | |
| 2015/0071372 A1 | 3/2015 | Zhang | |
| 2015/0117227 A1 | 4/2015 | Zhang et al. | |
| 2015/0117433 A1 | 4/2015 | Zhang et al. | |
| 2016/0156750 A1 | 6/2016 | Zhang et al. | |
| 2017/0288748 A1 | 10/2017 | Lou et al. | |

FOREIGN PATENT DOCUMENTS

| | | |
|---|---|---|
| WO | WO-2009/052420 | 4/2009 |
| WO | WO-2009/059229 | 5/2009 |
| WO | WO-2009/084926 | 7/2009 |
| WO | WO-2012/106635 | 8/2012 |
| WO | WO-2012/122119 | 9/2012 |
| WO | WO-2013/152111 | 10/2013 |
| WO | WO-2014/183059 | 11/2014 |

OTHER PUBLICATIONS

U.S. Appl. No. 15/265,614, Sun et al., "Physical Layer Frame Format for WLAN," filed Sep. 14, 2016.

U.S. Appl. No. 15/180,801, Sun et al., "Signaling PHY Preamble Formats," filed Jun. 13, 2016.

IEEE Std 802.11ad ™/D9.0 "Draft Standard for Information technology—Telecommunications and information Exchange Between Systems—Local and Metropolitan Area Networks Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).

IEEE Std 802.11af/D1.05 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std P802.11ad/D5.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).

de Vegt, "Potential Compromise for 802.11ah Use Case Document", Institute of Electrical and Electronics Engineers, doc. No. IEEE 802.11-11/0457r0, pp. 1-27 (Mar. 2011).

Francis, Michael, "Viterbi Decoder Block Decoding—Trellis Termination and Tail Biting," Xilinx XAPP551 v2.0, pp. 1-21 (Jul. 30, 2010).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Harada, "Project: IEEE P802.15 Working Group for Wireless Personal Area Network (WPANs)," IEEE 802.15/07/0693-003c (May 2007).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Lee et al., "TGaf PHY proposal," *The Institute of Electrical and Electronics Engineers*, doc. No. IEEE 802.11-12/0809r5, pp. 1-43, Jul. 10, 2012.

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11--yy/xxxxr05, (Jan. 2012).

(56) References Cited

OTHER PUBLICATIONS

Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Perahia et al., "Gigabit Wireless LANs: an overview of IEEE 802.11 ac and 80211 ad," ACM SIGMOBILE Mobile Computing and Communications Review, vo. 15, No. 3, pp. 23-33 (Jul. 2011).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.Nov. 10, 1361 r3 (Jan. 2011 ).
Stacey et al., "Specification Framework for TGac," document No. IEEE 802.11-09/0992r20, Institute tor Electrical and Electronics Engineers, pp. 1-49, Jan. 18, 2011.
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-11 (2009).
Taghavi et al., "Introductory Submission for TGah", doc. No. IEEE 802.11-11/0062r0, *Institute for Electrical and Electronics Engineers*, pp. 1-5 (Jan. 14, 2011).
van Nee et al., "The 802.11 n MIMO-OFDM Standard for Wireless LAN and Beyond," Wireless Personal Communications, vol. 37, pp. 445-453 (Jun. 2006).
van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Vermani et al., "Spec Framework Text for PHY Numerology," *The Institute of Electrical and Electronics Engineers*, doc. No. IEEE 802.11-11/13111.0, pp. 1-5 (Sep. 2011).
Vermani et al., "Preamble Format for 1 MHz," *The Institute of Electrical and Electronics Engineers*, doc. No. IEEE 802.11-11/1482r2, pp. 1-30 (Nov. 2011).
Yu et al., "Coverage extension for IEEE802.11ah," *The Institute of Electrical and Electronics Engineers*, doc. No. IEEE 802.11-11/0035r1 , pp. 1-10 (Jan. 2011).
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1 MHz Waveform in Wider BW ", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Zhang Zhao-Yang: "A Novel AFDM Transmission Scheme with Length-Adaptive Cyclic Prefix," Journal of Zhejiang University. Science, Zhejiant University Press, Hangzhou, CN vol. 5, No. 11, pp. 1336-1342 (Jul. 7, 2003).
Chen, "Home Network Basis: Transmission Environments and Wired/Wireless Protocols," Prentice Hall, pp. 1-26 (Jul. 2003).
Chun et al., "Legacy Support on HEW frame structure," doc: IEEE 11-13/1057r0, *The Institute of Electrical and Electronics Engineers, Inc.*, pp. 1-8 (Sep. 2013).
Hiertz et al., "The IEEE 802.11 Universe," IEEE Communications Magazine, pp. 62-70, (Jan. 2010).
Seok et al., "HEW PPDU Format for Supporting MIMO-OFDMA," IEEE 802.11-14/1210r0, 16 pages, (Sep. 14, 2014).
IEEE Std 802.11ac/D7.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," *The Institute of Electrical and Electronics Engineers, Inc.*, 221 pages (Mar. 2016).
IEEE Std 80211™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
Office Action in U.S. Appl. No. 15/265,614, dated Mar. 12, 2018 (30 pages).
Office Action in U.S. Appl. No. 15/265,614, dated Sep. 21, 2018 (26 pages).

\* cited by examiner

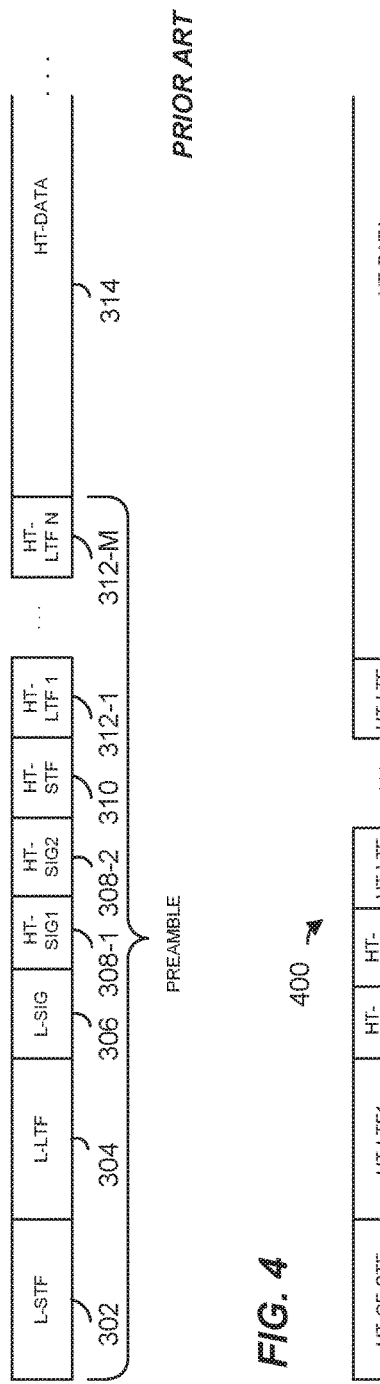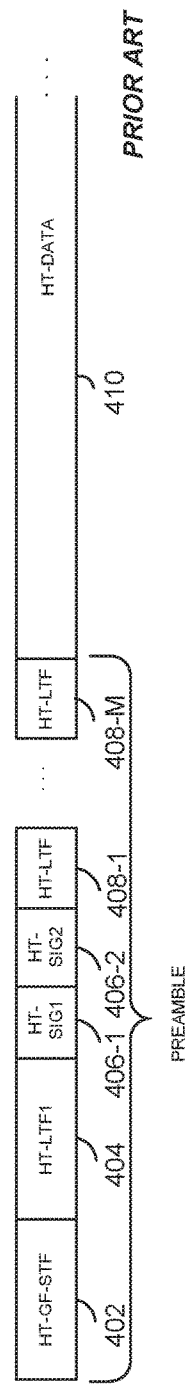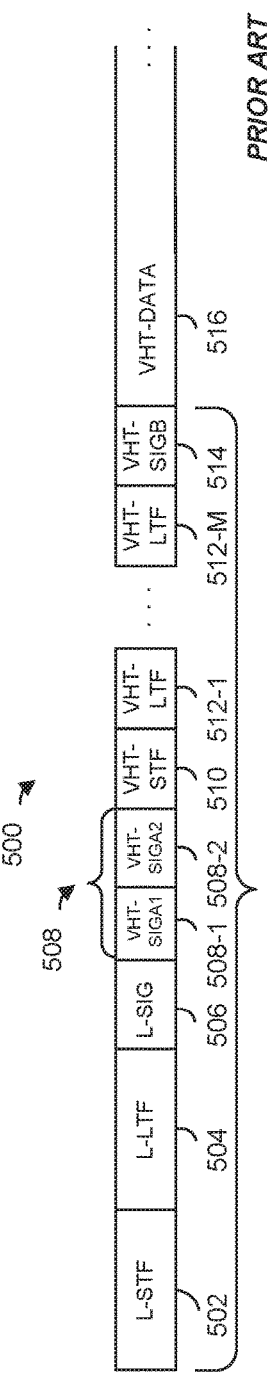

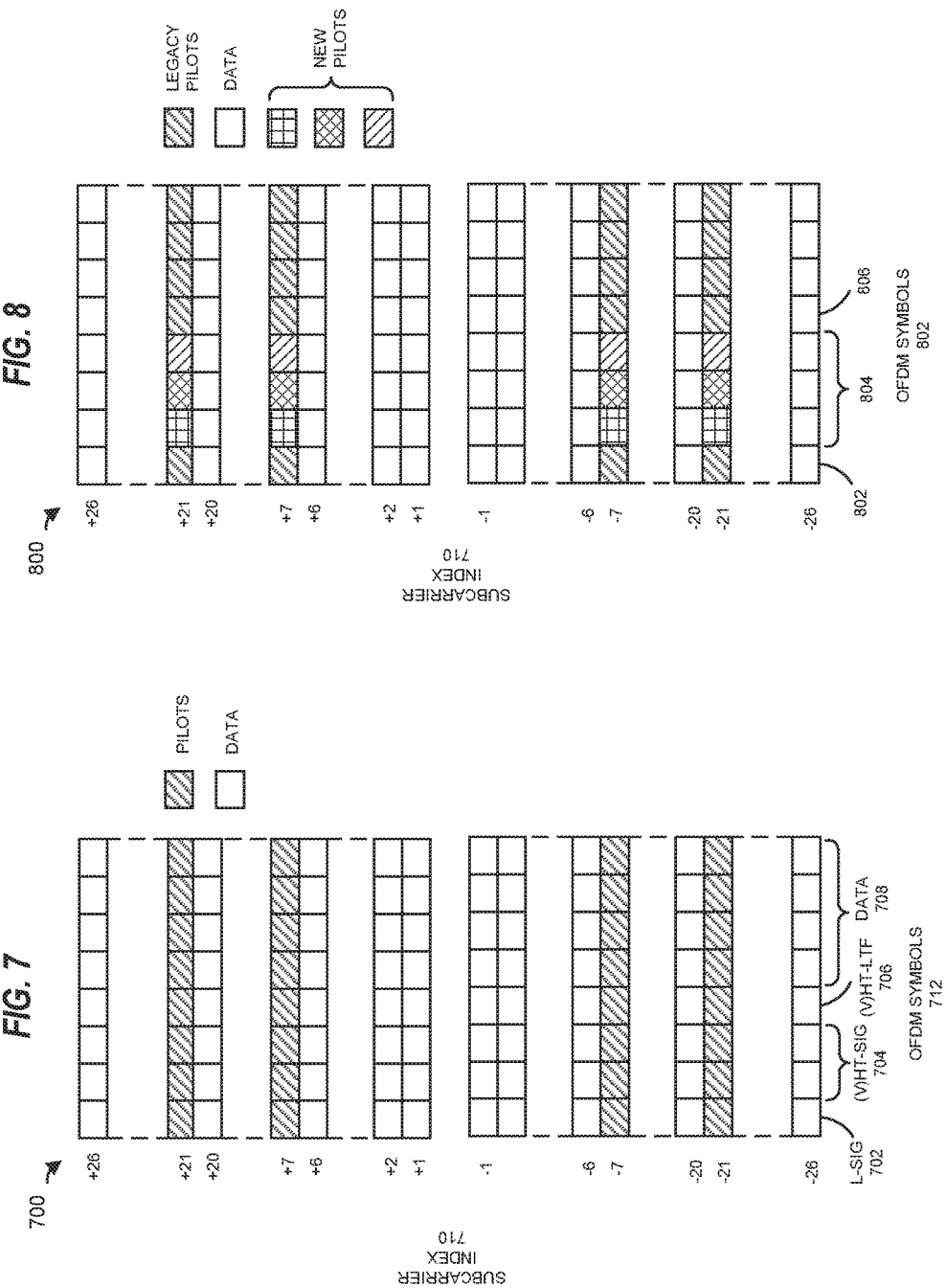

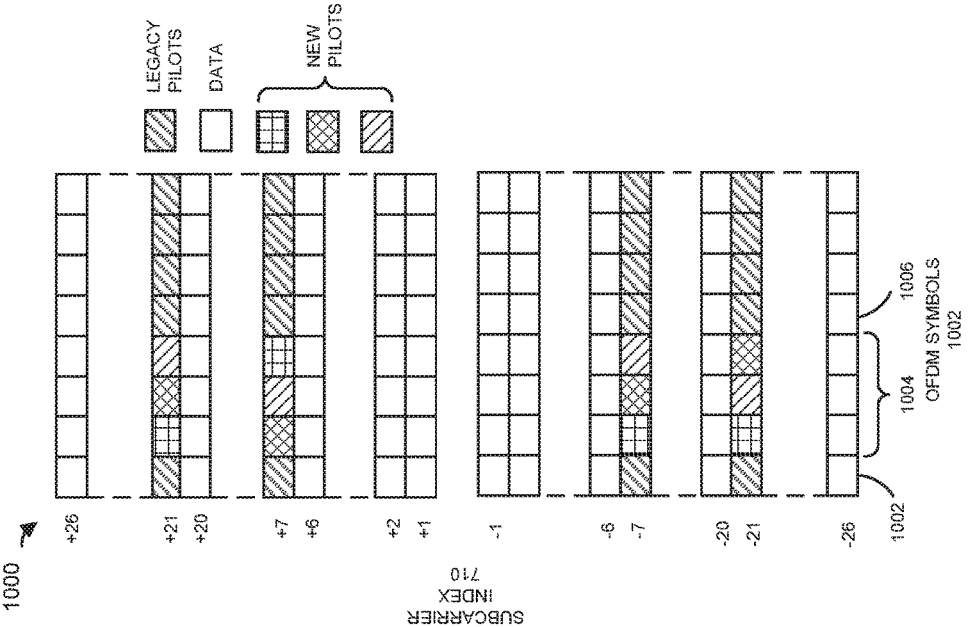
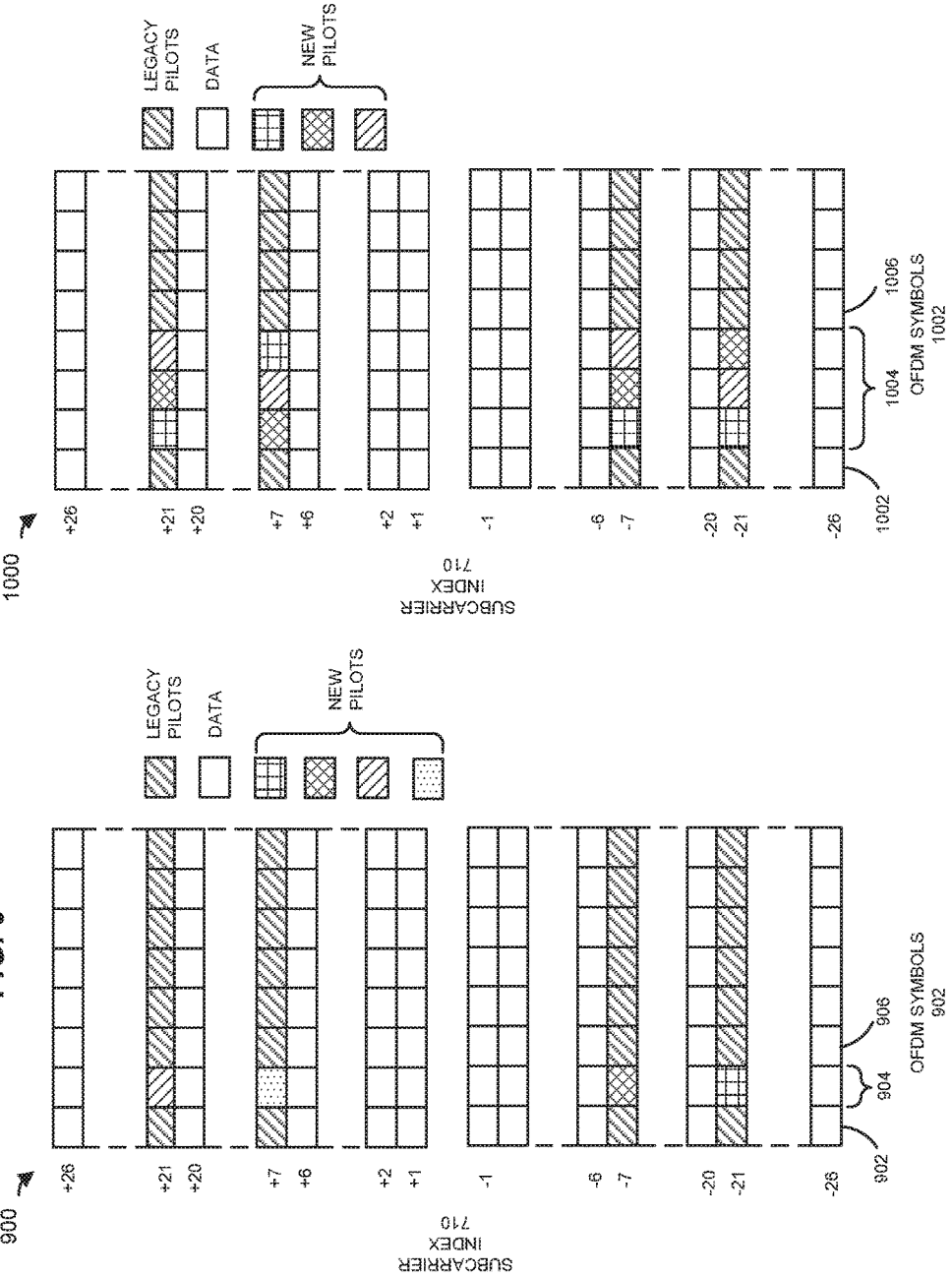

WIFI CLASSIFICATION BY PILOT SEQUENCES

CROSS-REFERENCES TO RELATED APPLICATIONS

This application claims the benefit of U.S. Provisional Patent Application No. 62/156,076, entitled "WiFi Classification by Pilot Sequences," filed on May 1, 2015, and U.S. Provisional Patent Application No. 62/218,309, entitled "Physical Layer Frame Format for WLAN," filed on Sep. 14, 2015, the disclosures of which are incorporated herein by reference in their entireties.

FIELD OF DISCLOSURE

The present disclosure relates generally to communication networks and, more particularly, to wireless local area networks that utilize multiple communication protocols and/or data unit formats.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: determining, at a communication device, a format according to which a data unit is to be generated, and selecting, at the communication device, a pilot sequence to be used for generating the data unit. The pilot sequence is selected from a plurality of pilot sequences corresponding to a plurality of data unit formats, and the pilot sequence is selected based on the determined format. The method also includes: generating, at the communication device, the data unit to include the selected pilot sequence, and transmitting, by the communication device, the data unit.

In another embodiment, an apparatus comprises a network interface device having one or more integrated circuits (ICs). The one or more ICs are configured to: determine a format according to which a data unit is to be generated, and select a pilot sequence to be used for generating the data unit. The pilot sequence is selected from a plurality of pilot sequences corresponding to a plurality of data unit formats, and the pilot sequence is selected based on the determined format. The one or more ICs are further configured to: generate the data unit to include the selected pilot sequence, and transmit the data unit.

In yet another embodiment, a method includes: receiving, at a communication device, a data unit via a communication channel, and determining, at the communication device, a pilot sequence in the received data unit. The method also includes: identifying, at the communication device, the pilot sequence in the received data unit from a plurality of pilot sequences corresponding to a plurality of data unit formats, and determining, at the communication device, a format of the received data unit corresponding to the identified pilot sequence. The method further includes processing, at the communication device, the received data unit according to the determined format.

In still another embodiment, an apparatus comprises a network interface device having one or more integrated circuits (ICs). The one or more ICs are configured to: receive a data unit via a communication channel, and determine a pilot sequence in the received data unit. The one or more ICs are also configured to identify the pilot sequence in the received data unit from a plurality of pilot sequences corresponding to a plurality of data unit formats, and determine a format of the received data unit based on the identified pilot sequence. The one or more ICs are further configured to process the received data unit according to the determined format.

BRIEF DESCRIPTION OF THE DRAWINGS

FIG. 3 is a diagram of another prior art PHY data unit that one or more communication devices in the network of FIG. 1 are configured to transmit, according to an embodiment.

FIG. 4 is a diagram of another prior art PHY data unit that one or more communication devices in the network of FIG. 1 are configured to transmit, according to an embodiment.

FIG. 5 is a diagram of yet another prior art PHY data unit that one or more communication devices in the network of FIG. 1 are configured to transmit, according to an embodiment.

FIG. 7 is a diagram illustrating orthogonal frequency division multiplexing (OFDM) symbols having pilot signals on some OFDM subcarriers as specified by a prior art communication protocol.

FIG. 8 is a diagram illustrating an example data unit including an example pattern of pilot signals that indicates a format of the data unit, according to an embodiment.

FIG. 9 is a diagram illustrating another example data unit including another example pattern of pilot signals that indicates a format of the data unit, according to an embodiment.

FIG. 10 is a diagram illustrating another example data unit including another example pattern of pilot signals that indicates a format of the data unit, according to an embodiment.

DETAILED DESCRIPTION

In embodiments described below, a wireless network device such as an access point (AP) or client station (STA) of a wireless local area network (WLAN) generates a data unit for transmission over a communication channel. The data unit includes a pilot sequence that is used for phase and frequency tracking, and channel estimation purposes, according to some embodiments. In some embodiments, the pilot sequence is configured to indicate a format of the data unit so that a receiver of the data unit can determine the format of the data unit using the pilot sequence. In some embodiments, the AP or the STA generates a WLAN orthogonal frequency division multiplexing (OFDM) data unit with a pilot sequence transmitted over pilot subcarriers of the communication channel. In an embodiment, a transmitter selects, based on a format of a data unit to be transmitted, a pilot sequence corresponding to the format of the data unit. In an embodiment, a receiver determines a format of a received data unit based on a pilot sequence of the received data unit. In some embodiments and/or scenarios, a pilot sequence is across multiple OFDM symbols of a data unit. In other embodiments and/or scenarios, a pilot sequence is over multiple pilot subcarriers in one OFDM symbol of a data unit.

In embodiments described below, a pilot sequence in a data unit is used to distinguish amongst different data unit formats corresponding to different communication protocols. In other embodiments, a pilot sequence is used to distinguish amongst different data unit formats of defined by a single communication protocol.

Figure 1:
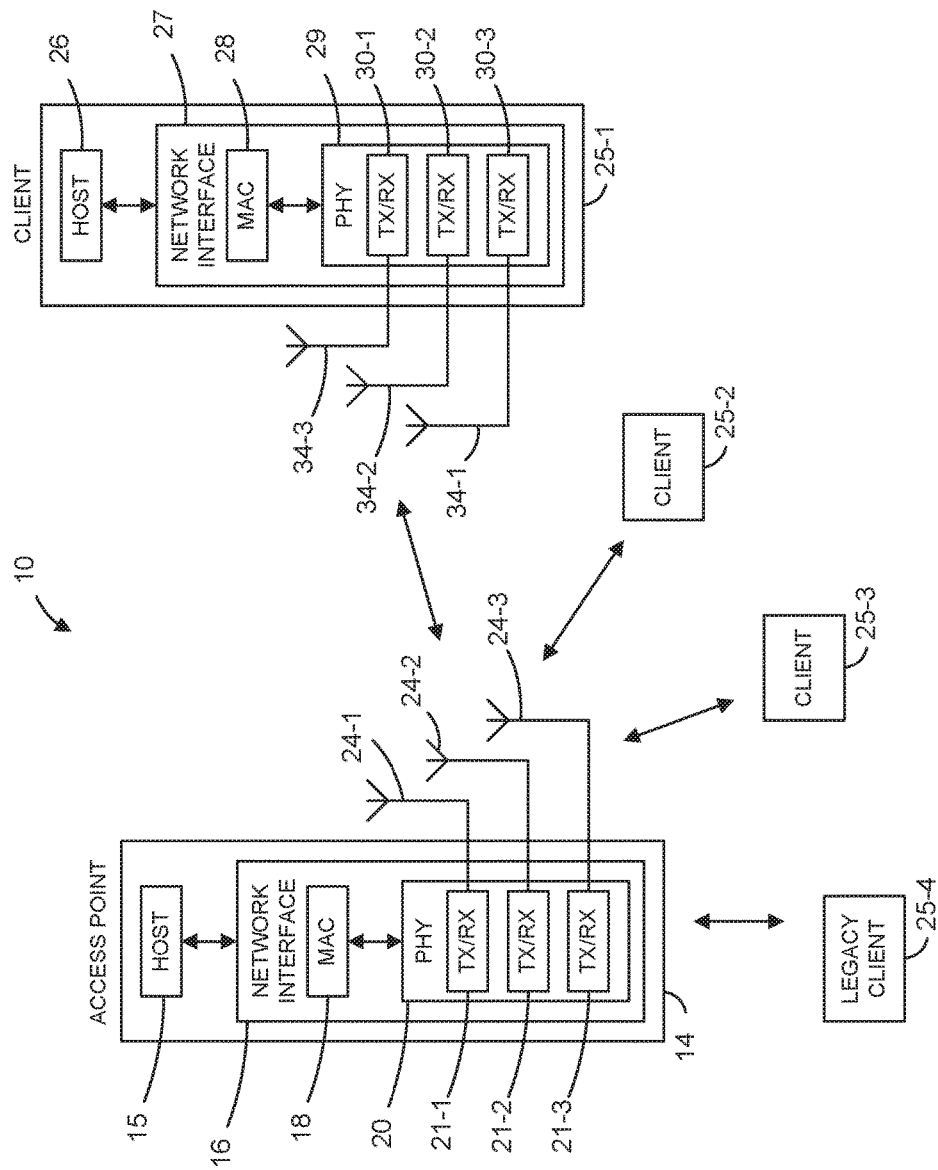
FIG. 1 is a block diagram of an example wireless communication network in which communication devices utilize pilot sequences to determine formats of data units, according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol. In some embodiments, the first communication protocol defines a plurality of different data unit formats (e.g., PHY data unit formats). In some embodiments, the first communication protocol defines a single data unit format (e.g., a single PHY data unit format). In some embodiments, the MAC processor 18 and the PHY processor 20 are also configured to operate according to a second communication protocol that defines one or more data unit formats (e.g., one or more PHY data unit formats) that are different than one or more data units formats defined by the first communication protocol. In some embodiments, the MAC processor 18 and the PHY processor 20 are additionally configured to operate according to a third legacy communication protocol, and/or a fourth legacy communication protocol (e.g., according to the IEEE 802.11 ac Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 (e.g., client station 25-1) is configured to operate at least according to the first communication protocol and according to the second communication protocol. In some embodiments, at least one of the client stations 25 is not configured to operate according to the first communication protocol but is configured to operate according to at least one of the third communication protocol and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. In some embodiments, the legacy client station 25-4 also is not enabled to receive and fully decode, as well as transmit, data units according to the second communication protocol. In some embodiments, the legacy client station 25-4 is enabled to receive and fully decode, as well as transmit, data units according to the second communication protocol. In some embodiments, the legacy client station 25-4 is enabled to receive and fully decode and transmit data units according to the third communication protocol and/or the fourth communication protocol, in some embodiments.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and/or the PHY processor 20 of the AP 14 are configured to generate data units conforming to the first communication protocol and/or data units conforming to the second communication protocol. The transceiver(s) 21 is/are configured to transmit the generated data units via the antenna(s) 24. Similarly, the transceiver(s) 21 is/are configured to receive data units via the antenna(s) 24. In some embodiments, the MAC processor 18 and/or the PHY processor 20 of the AP 14 are configured to process received data units conforming to the first communication protocol and having different data unit formats defined by the first communication protocol, and to determine that such data units conform to the various data unit formats of the first communication protocol, according to various embodiments. In some embodiments, the MAC processor 18 and the PHY processor 20 of the AP 14 are configured to process received data units conforming to the first communication protocol and data units conforming to the second communication protocol, and to determine that such data units conform to the first communication protocol or to the second communication protocol, according to various embodiments.

In various embodiments, the MAC processor 28 and the PHY processor 29 of the client device 25-1 are configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. In some embodiments, the MAC processor 28 and/or the PHY processor 29 are configured to process received data units conforming to the first communication protocol and having different data unit formats defined by the first communication protocol, and to determine that such data units conform to the various data unit formats of the first communication protocol, according to various embodiments. In some embodiments, he the MAC processor 28 and/or PHY processing unit 29 of the client device 25-1 are configured to process received data units conforming to the first communication protocol and data units conforming to the second communication protocol, and to determine that such data units conform to the first communication protocol or the second communication protocol, according to various embodiments.

Figure 2A:
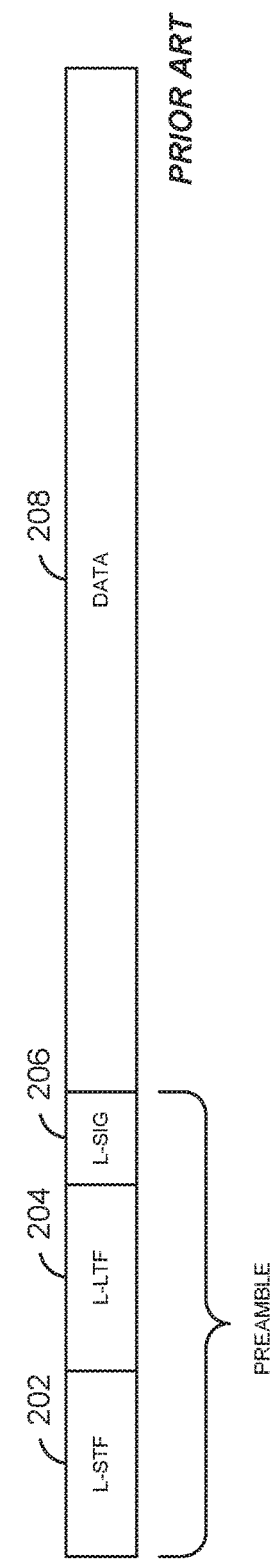
FIG. 2A is a diagram of a prior art physical layer (PHY) protocol data unit that one or more communication devices in the network of FIG. 1 are configured to transmit.
Figure 2B:
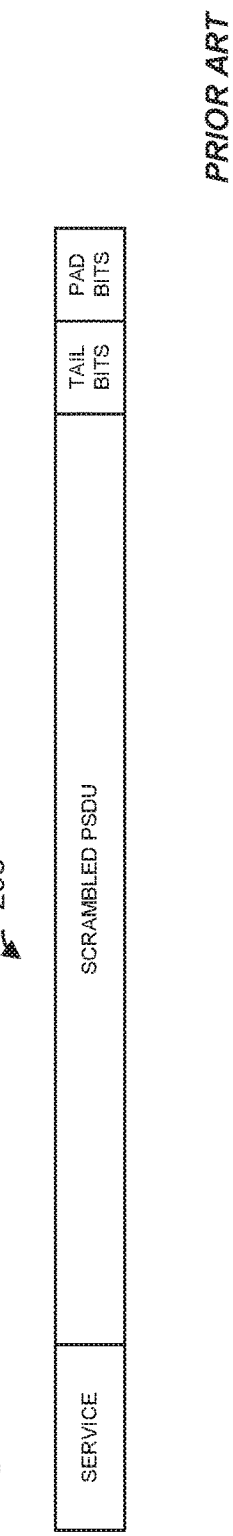
FIG. 2B is a diagram of a media access control (MAC) protocol data unit that is included in the data field of the PHY data unit of FIG. 2A.

FIG. 2A is a diagram of a prior art OFDM data unit 200 that the AP 14 is configured to transmit to the client station 25-4 via orthogonal frequency division multiplexing (OFDM) modulation, according to an embodiment. In an embodiment, the client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters of with the data unit 200, such as modulation type and coding rate used to transmit the data unit, for example. The data unit 200 also includes a data portion 208. FIG. 2B is a diagram of example data portion 208 (not low density parity check encoded, which includes a service field, a scrambled physical layer service data unit (PSDU), tail bits, and padding bits, if needed. The data unit 200 is designed for transmission over one spatial or space-time stream in a single input single output (SISO) channel configuration.

FIG. 3 is a diagram of a prior art OFDM data unit 300 that the AP 14 is configured to transmit to the client station 25-4 via orthogonal frequency domain multiplexing (OFDM) modulation, according to an embodiment. In an embodiment, the client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally determined by the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

FIG. 4 is a diagram of a prior art OFDM data unit 400 that the AP 14 is configured to transmit to the client station 25-4 via orthogonal frequency domain multiplexing (OFDM) modulation, according to an embodiment. In an embodiment, the client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 400 also includes a data portion 410.

FIG. 5 is a diagram of a prior art OFDM data unit 500 that the client station AP 14 is configured to transmit to the client station 25-4 via orthogonal frequency domain multiplexing (OFDM) modulation, according to an embodiment. In an embodiment, the client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510. M very high throughput long training fields (VHT-LTFs) 512, where M is an integer, and a second very high throughput signal field (VHT-SIG-B) 514. The data unit 500 also includes a data portion 516.

Figure 6:
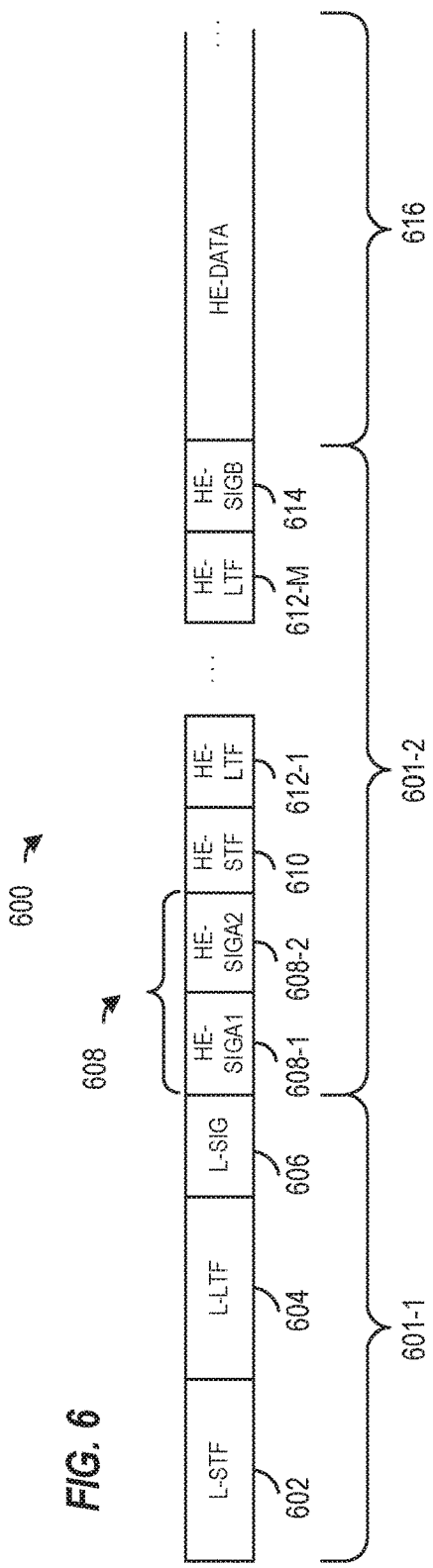
FIG. 6 is a diagram of an example PHY data unit that one or more communication devices in the network of FIG. 1 are configured to transmit, according to an embodiment.

FIG. 6 is a diagram of an OFDM data unit 600 that the client station AP 14 is configured to transmit to the client station 25-1 via orthogonal frequency domain multiplexing (OFDM) modulation, according to an embodiment. In an embodiment, the client station 25-1 is also configured to transmit the data unit 600 to the AP 14. In an embodiment, the data unit 600 conforms to the first communication protocol and occupies a 20 MHz bandwidth. Data units that conform to the first communication protocol similar to the data unit 600 may occupy other suitable bandwidths such as 40 MHz, 80 MHz, 160 MHz, 320 MHz, 640 MHz, etc., for example, or other suitable bandwidths, in other embodiments. The data unit 600 is suitable for "mixed mode" situations, i.e., when the WLAN 10 includes a client station (e.g., the legacy client station 25-4) that conforms to a legacy communication protocol, but not the first communication protocol. The data unit 600 is utilized in other situations as well, in some embodiments.

In an embodiment, the data unit 600 includes a preamble 601 having an L-STF 602, an L-LTF 604, an L-SIG 606, two first HE signal fields (HE-SIGAs) 608 including a first HE signal field (HE-SIGA1) 608-1 and a second HE signal field (HE-SIGA2) 608-2, a HE short training field (HE-STF) 610, an integer number M HE long training fields (HE-LTFs) 612, and a third HE signal field (HE-SIGB) 614. In an embodiment, the preamble 601 includes a legacy portion 601-1, including the L-STF 602, the L-LTF 604, and the L-SIG 606, and a non-legacy portion 601-2, including the HE-SIGAs 608, HE-STF 610, M HE-LTFs 612, and HE-SIGB 614.

Each of the L-STF 602, the L-LTF 604, the L-SIG 606, the HE-SIGAs 608, the HE-STF 610, the M HE-LTFs 612, and the HE-SIGB 614 are included in an integer number of one or more OFDM symbols. For example, in an embodiment, the HE-SIGAs 608 correspond to two OFDM symbols, where the HE-SIGA1 608-1 field is included in the first OFDM symbol and the HE-SIGA2 is included in the second OFDM symbol. In another embodiment, for example, the preamble 601 includes a third HE signal field (HE-SIGA3, not shown) and the HE-SIGAs 608 correspond to three OFDM symbols, where the HE-SIGA1 608-1 field is included in the first OFDM symbol, the HE-SIGA2 is included in the second OFDM symbol, and the HE-SIGA3 is included in the third OFDM symbol. In at least some examples, the HE-SIGAs 608 are collectively referred to as a single HE signal field (HE-SIGA) 608. In some embodiments, the data unit 600 also includes a data portion 616. In other embodiments, the data unit 600 omits the data portion 616 (e.g., the data unit 600 is a null-data frame).

In the embodiment of FIG. 6, the data unit 600 includes one of each of the L-STF 602, the L-LTF 604, the L-SIG 606, and the HE-SIGAs 608. In other embodiments in which an OFDM data unit similar to the data unit 600 occupies a cumulative bandwidth other than 20 MHz, each of the L-STF 602, the L-LTF 604, the L-SIG 606, the HE-SIGAs 608 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 602, the L-LTF 604, the L-SIG 606, and the HE-SIGAs 608 in four 20 MHz-wide sub-bands that cumulatively span the 80 MHz bandwidth, in an embodiment.

The co-existence, in a communication network, of multiple devices conforming to different communication protocols using different data unit formats, requires an ability within a receiver device to determine, in a received data unit, the communication protocol used for the received data unit. In addition, a single communication protocol can define multiple data unit formats corresponding to, for example, different operation modes, different transmission ranges, different throughputs, different power consumption levels, etc. Hence, it is often useful for a receiver to make a determination regarding the format of a received data unit so that the receiver can process the data unit according to the correct data unit format.

In some embodiments/scenarios, it is advantageous to distinguish amongst the multiple data unit formats early within a received data unit, such as during reception and/or processing of a PHY preamble. Early detection of the data unit format is useful, for example, when different data unit formats have different corresponding PHY preamble formats, at least in some embodiments.

Pilots, transmitted in the form of pilot sequences that are modulated over pilot subcarriers and typically used for phase and frequency tracking, and channel estimation purposes, are used for enabling distinction between different data unit formats, according to some embodiments.

FIG. 7 is a diagram of a prior art OFDM data unit 700 that the AP 14 is configured to transmit to one or more of the client stations 25 via orthogonal frequency domain multiplexing (OFDM) modulation, according to an embodiment. In an embodiment, one or more of the client stations 25 are also configured to transmit the OFDM data unit 700 to the AP 14. In an embodiment, the data unit 700 conforms to the IEEE 802.11n Standard and is designed for "Mixed field" situations. In another embodiment, the OFDM data unit 700 conforms to the IEEE 802.11ac Standard and is designed for "Mixed field" situations. In the embodiment of FIG. 7, the OFDM data unit 700 occupies a 20 MHz bandwidth. The OFDM data unit 700 includes 52 total subcarriers, comprising 48 data subcarriers and 4 pilot subcarriers, and the pilot subcarriers are located on subcarrier indices ±7, ±21. In an embodiment, the subcarriers are spaced 312.5 kHz apart. The pilot subcarriers modulate pilot sequences that are defined by a communication protocol (e.g., defined by the IEEE 802.11ac Standard). In some embodiments, PHY preamble fields L-SIG, HT-SIG, HT-LTFs, and a data portion (see e.g., FIG. 4) are transmitted using all of the data subcarriers of the OFDM data unit 700. In other embodiments, PHY preamble fields L-SIG, VHT-SIGAs, VHT-LTFs, and a data portion (see e.g., FIG. 5) are transmitted using all of the data subcarriers of the OFDM data unit 700.

In some embodiments, an n-th OFDM symbol of the OFDM data unit 700, e.g., starting from L-SIG, is given by:

$$r_n(t) = \frac{1}{\sqrt{N_{field}^{tone}}} \sum_{k=-N_{SD}}^{N_{SD}} (x_{n,k} + p_n P_k) \exp(j2\pi k \Delta_F (t - T_{GI}))$$

Equation 1 where, $x_{n,k}$ is a value of a mapped constellation point of the data unit for the n-th symbol at a k-th subcarrier tone, k is a subcarrier index, $\pm N_{SD}$ are the minimum and maximum subcarrier indices, $\Delta_F$ is a subcarrier bandwidth, $p_n$ is an n-th value of a bit sequence defined by a communication protocol, $P_k$ is another sequence defined by the communication protocol, and $T_{GI}$ is a guard interval duration. Parameter $p_n P_k$ sets a pilot value at the n-th symbol and k-th subcarrier tone. In some embodiments, $P_k = \{1,1,1,-1\}$ are pilot values at k=−21, −7, 7, and 21, and zero at other values of k. In some embodiments, $p_n$ is a cyclic extension of a 127-bit sequence.

In embodiments described herein, data unit formats (e.g., PHY data unit formats) are distinguished based on pilot sequences in OFDM symbols of a data unit. In various embodiments, one or more pilot sequences are selected from a plurality of pilot sequences based on a format of the data unit to be transmitted, wherein different pilot sequences in the plurality of pilot sequences correspond to different data unit formats (e.g., PHY data unit formats). In some embodiments, the one or more selected pilot sequences span multiple OFDM symbols of the data unit. In other embodiments, the one or more selected pilot sequences span a single OFDM symbol of the data unit. In some embodiments, a format of a received data unit is determined on the basis of an identified pilot sequence in the received data unit.

FIG. 8 is a diagram of an example data unit 800 that the AP 14 is configured to generate and transmit to the client station 25-1 via OFDM modulation, according to some embodiments. In some embodiments, the client station 25-1 is also configured to generate and transmit the data unit 800 to the AP 14. In an embodiment, the data unit 800 conforms to the first communication protocol and occupies a 20 MHz bandwidth. In other embodiments, the data unit 800 occupies another suitable bandwidth, such as 5 MHz, 10 MHz, 40 MHz, etc. The OFDM data unit 800 includes 52 total subcarriers, comprising 48 data subcarriers and 4 pilot subcarriers, and the pilot subcarriers are located on subcarrier indices ±7, ±21. In an embodiment, the subcarriers are spaced 312.5 kHz apart. The pilot subcarriers modulate pilot sequences. In some embodiments, different suitable numbers of one or both of i) total subcarriers, and/or ii) pilot subcarriers, are utilized. In some embodiments, pilot subcarriers are located at suitable subcarrier indices other than ±7, ±21, and/or a suitable subcarrier spacing other than 312.5 kHz is utilized.

The AP 14 or the client station 25-1 selects a pilot sequence based on the format of the data unit 800 that is to be transmitted, where different pilot sequences correspond to different data unit formats, according to some embodiments. The selected pilot sequence is included in the data unit 800 on pilot subcarriers. The AP 14 or the client station 25-1 selects the pilot sequence from a plurality of pilot sequences that correspond to a plurality of different data unit formats. In some embodiments, the selected pilot sequence is used for generating pilots on pilot subcarriers across multiple OFDM symbols 804 of the data unit 800.

In the illustrative embodiment of FIG. 8, some pilots (sometimes referred to herein as "new pilots") are different as compared to the pilot tone sequence illustrated in FIG. 7. Thus, in an embodiment, a receiver is configured to recognize the pilot tone sequence illustrated in FIG. 8 as compared to the pilot tone sequence illustrated in FIG. 7, and based on the recognition, determine that the data unit 800 conforms to the first communication protocol, for example, rather than another communication protocol to which the data unit 700 of FIG. 7 conforms.

While the embodiment of FIG. 8 illustrates different pilots (as compared to the pilots illustrated in FIG. 7) on three OFDM symbols 804, in other embodiments, different pilots are on a different suitable number of OFDM symbols (e.g., one, two, four, five, etc.).

In FIG. 8, some pilots (sometimes referred to herein as "legacy pilots") are the same as pilots illustrated in FIG. 7.

In some embodiments, the OFDM symbols 804 comprising the new pilots are included in the data unit 800 after an OFDM symbol 802 that includes legacy pilots. In some embodiments, an OFDM symbol 806 that follows the OFDM symbols 804 comprises legacy pilots. In some embodiments, the OFDM symbol 802 corresponds to L-SIG 606 (FIG. 6). In some embodiments, the OFDM symbols 804 correspond to HE-SIG fields 608 and HE-STF 610 (FIG. 6). In some embodiments, the OFDM symbol 806 corresponds to HE-LTF 612-1 (FIG. 6).

Referring now to FIGS. 1 and 8, in some embodiments, the AP 14 is configured to receive the data unit 800 from the client station 25-1. The AP 14 (e.g., the PHY processor 20) determines a pilot sequence that is modulated by pilot subcarriers of the received data unit 800. The AP 14 (e.g., the PHY processor 20) then identifies the pilot sequence from among a plurality of pilot sequences corresponding to a plurality of data unit formats. As merely an illustrative example, the AP 14 (e.g., the PHY processor 20) determines that that the pilot sequence corresponds to the sequence illustrated in FIG. 8 as compared to another one or more sequences, such as the sequence illustrated in FIG. 7. In some embodiments, the plurality of data unit formats include different data unit formats corresponding to different communication protocols and/or corresponding to different data unit formats of a single communication protocol. Following identification of the data unit format, the AP 14 (e.g., the PHY processor 20 and/or the MAC processor 18) processes the received data unit 800 according to the identified data unit format.

Similarly, in an embodiment, the client station 25-1 is configured to receive the data unit 800 from the AP 14 or from another client station 25. The client station 25-1 (e.g., the PHY processor 29) determines a pilot sequence that is modulated by pilot subcarriers of the received data unit 800. The client station 25-1 (e.g., the PHY processor 29) then identifies the pilot sequence from among a plurality of pilot sequences corresponding to a plurality of data unit formats. As merely an illustrative example, the AP client station 25-1 (e.g., the PHY processor 29) determines that that the pilot sequence corresponds to the sequence illustrated in FIG. 8 as compared to another one or more sequences, such as the sequence illustrated in FIG. 7. In some embodiments, the plurality of data unit formats include different data unit formats corresponding to different communication protocols and/or corresponding to different data unit formats of a single communication protocol (e.g., multiple data unit formats of the first communication protocol). Following identification of the data unit format, the client station 25-1 (e.g., the PHY processor 29 and/or the MAC processor 28) processes the received data unit 800 according to the identified data unit format.

FIG. 9 is a diagram of an example data unit 900 that the AP 14 and/or the client station 25-1 is configured to generate and transmit according to some embodiments. The data unit 900 is similar to the OFDM data unit 800 in some embodiments. The AP 14 or the client station 25-1 selects a pilot sequence based on the data unit format of the data unit 900 that is to be transmitted. The AP 14 or the client station 25-1 selects the pilot sequence from a plurality of pilot sequences that correspond to a plurality of data unit formats, in some embodiments. The selected pilot sequence is used for generating pilots that are transmitted on pilot subcarriers of one OFDM symbol 904 of the OFDM data unit 900.

In the illustrative embodiment of FIG. 9, some pilots (sometimes referred to herein as "new pilots") are different as compared to the pilot tone sequence illustrated in FIG. 7. Thus, in an embodiment, a receiver is configured to recognize the pilot tone sequence illustrated in FIG. 9 as compared to the pilot tone sequence illustrated in FIG. 7, and based on the recognition, determine that the data unit 900 conforms to the first communication protocol, for example, rather than another communication protocol to which the data unit 700 of FIG. 7 conforms.

In the illustrative embodiment of FIG. 9, some pilots are different as compared to the pilot tone sequence illustrated in FIG. 8. Thus, in an embodiment, a receiver is configured to recognize the pilot tone sequence illustrated in FIG. 9 as compared to the pilot tone sequence illustrated in FIG. 8, and based on the recognition, determined that the data unit 900 is of a different format, for example, as compared to a data unit format of the data unit 800 of FIG. 8.

In some embodiments, the OFDM symbol 904 is included in the data unit 900 after an OFDM symbol 902 that includes legacy pilots. In some embodiments, an OFDM symbol 906 that follows the OFDM symbols 904 comprises legacy pilots. In some embodiments, the OFDM symbol 902 corresponds to L-SIG 606 (FIG. 6). In some embodiments, the OFDM symbol 904 corresponds to HE-SIGA1 608-1 (FIG. 6). In some embodiments, the OFDM symbol 906 corresponds to HE-SIGA1 608-2 (FIG. 6).

Referring now to FIGS. 1 and 9, in some embodiments, the AP 14 is configured to receive the data unit 900 from the client station 25-1. The AP 14 (e.g., the PHY processor 20) determines a pilot sequence that is modulated by pilot subcarriers of the received data unit 900. The AP 14 (e.g., the PHY processor 20) then identifies the pilot sequence from among a plurality of pilot sequences corresponding to a plurality of data unit formats. As merely an illustrative example, the AP 14 (e.g., the PHY processor 20) determines that that the pilot sequence corresponds to the sequence illustrated in FIG. 9 as compared to another one or more sequences, such as the sequence illustrated in FIG. 7 and/or the sequence illustrated in FIG. 8. In some embodiments, the plurality of data unit formats include different data unit formats corresponding to different communication protocols and/or corresponding to different data unit formats of a single communication protocol (e.g., multiple data unit formats of the first communication protocol). Following identification of the data unit format, the AP 14 (e.g., the PHY processor 20 and/or the MAC processor 18) processes the received data unit 900 according to the identified data unit format.

Similarly, in an embodiment, the client station 25-1 is configured to receive the data unit 900 from the AP 14 or from another client station 25. The client station 25-1 (e.g., the PHY processor 29) determines a pilot sequence that is modulated by pilot subcarriers of the received data unit 900. The client station 25-1 (e.g., the PHY processor 29) then identifies the pilot sequence from among a plurality of pilot sequences corresponding to a plurality of data unit formats. As merely an illustrative example, the AP client station 25-1 (e.g., the PHY processor 29) determines that that the pilot sequence corresponds to the sequence illustrated in FIG. 9 as compared to another one or more sequences, such as the sequence illustrated in FIG. 7 and/or the sequence illustrated in FIG. 8. In some embodiments, the plurality of data unit formats include different data unit formats corresponding to different communication protocols and/or corresponding to different data unit formats of a single communication protocol (e.g., different data unit formats of the first communication protocol). Following identification of the data unit format, the client station 25-1 (e.g., the PHY processor 29 and/or the MAC processor 28) processes the received data unit 900 according to the identified data unit format.

FIG. 10 is a diagram of OFDM data unit 1000 that the AP 14 and/or the client station 25-1 is configured to generate and transmit according to some embodiments. The OFDM data unit 1000 is similar to the OFDM data unit 800 in some embodiments. The AP 14 or the client station 25-1 selects a pilot sequence based on the format of the OFDM data unit 1000 to be transmitted. The AP 14 or the client station 25-1 selects a pilot sequence from a plurality of pilot sequences that correspond to a plurality of data unit formats. In some embodiments, the selected pilot sequence is used for generating pilots on pilot subcarriers across multiple OFDM symbols 1004 of the data unit 1000.

In the illustrative embodiment of FIG. 10, some pilots (sometimes referred to herein as "new pilots") are different as compared to the pilot tone sequence illustrated in FIG. 7. Thus, in an embodiment, a receiver is configured to recognize the pilot tone sequence illustrated in FIG. 10 as compared to the pilot tone sequence illustrated in FIG. 7, and based on the recognition, determined that the data unit 1000 conforms to the first communication protocol, for example, rather than another communication protocol to which the data unit 700 of FIG. 7 conforms.

In the illustrative embodiment of FIG. 10, some pilots are different as compared to the pilot tone sequences illustrated in FIGS. 8 and 9. Thus, in an embodiment, a receiver is configured to recognize the pilot tone sequence illustrated in FIG. 10 as compared to the pilot tone sequences illustrated in FIGS. 8 and 9, and based on the recognition, determined that the data unit 1000 is of a different format, for example, as compared to a data unit formats of the data units 800 and 900 of FIGS. 8 and 9.

While the embodiment of FIG. 10 illustrates different pilots (as compared to the pilots illustrated in FIG. 7) on three OFDM symbols 1004, in other embodiments, different pilots are on a different suitable number of OFDM symbols (e.g., one, two, four, five, etc.).

In FIG. 10, some pilots (sometimes referred to herein as "legacy pilots") are the same as pilots illustrated in FIG. 7.

In some embodiments, the OFDM symbols 1004 comprising the new pilots are included in the data unit 1000 after an OFDM symbol 1002 that includes legacy pilots. In some embodiments, an OFDM symbol 1006 that follows the OFDM symbols 1004 comprises legacy pilots. In some embodiments, the OFDM symbol 1002 corresponds to L-SIG 606 (FIG. 6). In some embodiments, the OFDM symbols 1004 corresponds to HE-SIG fields 608 and HE-STF 610 (FIG. 6). In some embodiments, the OFDM symbol 1006 corresponds to HE-LTF 612-1 (FIG. 6).

Referring now to FIGS. 1 and 10, in some embodiments, the AP 14 is configured to receive the data unit 1000 from the client station 25-1. The AP 14 (e.g., the PHY processor 20) determines a pilot sequence that is modulated by pilot subcarriers of the received data unit 1000. The AP 14 (e.g., the PHY processor 20) then identifies the pilot sequence from among a plurality of pilot sequences corresponding to a plurality of data unit formats. As merely an illustrative example, the AP 14 (e.g., the PHY processor 20) determines that that the pilot sequence corresponds to the sequence illustrated in FIG. 10 as compared to another one or more sequences, such as one or more of the sequences illustrated in FIGS. 7-9. In some embodiments, the plurality of data unit formats include different data unit formats corresponding to different communication protocols and/or corresponding to different data unit formats of a single communication protocol (e.g., multiple data unit formats of the first communication protocol). Following identification of the data unit format, the AP 14 (e.g., the PHY processor 20 and/or the MAC processor 18) processes the received data unit 1000 according to the identified data unit format.

Similarly, in an embodiment, the client station 25-1 is configured to receive the data unit 1000 from the AP 14 or from another client station 25. The client station 25-1 (e.g., the PHY processor 29) determines a pilot sequence that is modulated by pilot subcarriers of the received data unit 1000. The client station 25-1 (e.g., the PHY processor 29) then identifies the pilot sequence from among a plurality of pilot sequences corresponding to a plurality of data unit formats. As merely an illustrative example, the AP client station 25-1 (e.g., the PHY processor 29) determines that that the pilot sequence corresponds to the sequence illustrated in FIG. 10 as compared to another one or more sequences, such as one or more of the sequences illustrated in FIGS. 7-9. In some embodiments, the plurality of data unit formats include different data unit formats corresponding to different communication protocols and/or corresponding to different data unit formats of a single communication protocol (e.g., different data unit formats of the first communication protocol). Following identification of the data unit format, the client station 25-1 (e.g., the PHY processor 29 and/or the MAC processor 28) processes the received data unit 1000 according to the identified data unit format.

In some embodiments, an n-th symbol of an OFDM data unit starting from L-SIG is expressed as:

$$r_n(t) = \frac{1}{\sqrt{N_{field}^{tone}}} \sum_{k=-N_{SD}}^{N_{SD}} (x_{n,k} + p_n c_{n,k} P_k) \exp(j2\pi k \Delta_F (t - T_{GI})) \quad \text{Equation 2}$$

where $c_{n,k}$ is an n-th value of a sequence at the k-th subcarrier tone. Parameter $p_n c_{n,k} P_k$ sets a pilot value of the pilot sequence at the n-th symbol and the k-th subcarrier tone, and the sequence $c_{n,k}$ is selected from a plurality of sequences on a data unit format of the data unit to be transmitted.

In one such embodiment according to Equation 2, the sequence varies for different OFDM symbols, but is identical for all pilot subcarrier tones in each OFDM symbol. In the embodiment where a total of 52 subcarriers are present, pilot subcarrier tones at subcarrier indices ±7, ±21 modulate a pilot sequence which is set by the selected sequence $c_{n,k}$. In some embodiments, some values of the sequence $c_{n,k}$ correspond to a value of a pilot flipped in polarity as compared to other sequences $c_{n,k}$ and/or as compared to legacy pilots. In one illustrative embodiment, an n-th value of the sequence at a k-th subcarrier tone is defined by an equation:

$$c_{n,k} = \begin{cases} 1 & n \in \{1\} \cup \Omega_1 \\ -1 & n \in \Omega_2 \end{cases}, \text{for } k = \pm 7, \pm 21 \quad \text{Equation 3}$$

where the OFDM symbol corresponding to n=1 corresponds to L-SIG 606 (FIG. 6), $\Omega_1$ is a first set of OFDM symbols in the data unit, and $\Omega_2$ is a second set of OFDM symbols in the data unit. In another embodiment, $c_{n,k}$ includes one or more elements that is/are complex valued. In another embodiment, $c_{n,k}$ is different for each symbol in $\Omega_2$.

In an embodiment according to Equation 2, multiple elements of $c_{n,k}$ for multiple pilots in a single OFDM symbol have different values. In another embodiment according to Equation 2, elements of the sequence $c_{n,k}$ corresponding pilots in an OFDM symbol are all different. In an embodiment where a total of 52 subcarriers are present, pilot subcarrier tones at subcarrier indices ±7, ±21 modulate pilot sequences which are set by a selected sequence. In one such embodiment, an n-th value of the sequence at a k-th subcarrier tone is defined by an equation:

$$c_{n,k} = \begin{cases} [1 \quad 1 \quad 1 \quad 1] & n \in \{1\} \cup \Omega_1 \\ [s_{n,1} \quad s_{n,2} \quad s_{n,3} \quad s_{n,4}] & n \in \Omega_2 \end{cases} \quad \text{Equation 4}$$

where parameters $s_{n,k}$ correspond to suitable values for distinguishing between different pilot tone sequences. In an embodiment, each symbol in $\Omega_2$ uses a same set of parameters $s_{n,k}$. In another embodiment, multiple symbols in $\Omega_2$ use different sets of parameters $s_{n,k}$. In another embodiment, each symbol in $\Omega_2$ uses a unique and different set of parameters $s_{n,k}$. In an embodiment, parameters among the set of parameters $s_{n,k}$ are integers. In an embodiment, parameters among the set of parameters $s_{n,k}$ are real-valued numbers. In an embodiment, parameters among the set of parameters $s_{n,k}$ are complex valued numbers.

In some embodiments, a pilot sequence for a data unit is selected from among a plurality of pilot sequences, wherein the plurality of pilot sequences are in a look-up table stored in a memory of the AP 14 and/or the client station 25-1. In another embodiment, a pilot sequence is generated using a sequence which is selected from a plurality of sequences in a look-up table stored in a memory of the AP 14 and/or the client station 25-1. In an embodiment, a pilot sequence is generated using $p_n c_{n,k} P_k$ as discussed above. In another embodiment, a pilot sequence is generated using selected parameters according to another suitable method. In an embodiment, a sequence corresponds to a parameter having a different format as compared to Equation 3 and Equation 4.

Following the selection of a pilot sequence, the AP 14 or the client station 25-1, generates a data unit to include the selected pilot sequence. The generated data unit is then transmitted.

Referring again to FIG. 8, in some embodiments, where an n-th OFDM symbol of a data unit corresponds to Equation 2, a pilot sequence in the received data unit 800 is defined by the parameter $p_n c_{n,k} P_k$, and identifying the pilot sequence includes identifying whether the pilot sequence in the received data unit 800 is in accordance with the parameter $p_n c_{n,k} P_k$. Similarly, referring again to FIGS. 9 and 10, in other embodiments, a pilot sequence in the data unit 900 or the data unit 1000 is defined by the parameter $p_n c_{n,k} P_k$, and identifying the pilot sequence includes identifying whether the pilot sequence in the received data unit 900/1000 is in accordance with the parameter $p_n c_{n,k} P_k$. In some embodiments, identifying a pilot sequence defined by a parameter $p_n c_{n,k} P_k$ includes identifying the sequence $c_{n,k}$. Parameter $p_n c_{n,k} P_k$ can be used to determine a set of values (e.g., for multiple pilot tones at different values of k) of the sequence $c_{n,k}$, for a given n.

In some embodiments, a sequence $c_{n,k}$ in the data unit 800, the data unit 900, or the data unit 1000 is defined by a specification such as Equation 3 or Equation 4 (or according to another equation or specification), and identifying the sequence $c_{n,k}$ includes identifying whether the sequence is corresponds to the specification. In other embodiments, a pilot sequence is identified from a sequence $c_{n,k}$ using suitable mathematical operations different from that defined in Equations 2-4.

In some embodiments, a pilot sequence for a received data unit (e.g., the data unit 800, the data unit 900, the data unit 1000, or another suitable data unit) is identified from among a plurality of pilot sequences, wherein indications of the plurality of pilot sequences are stored in a memory of a communication device that received the data unit (e.g., the AP 14, the client device 25-1, etc.). In some embodiments, a sequence $c_{n,k}$ is determined from a pilot sequence in the received data unit (e.g., the data unit 800, the data unit 900, the data unit 1000, or another suitable data unit), and the sequence $c_{n,k}$ is identified from a plurality of sequences $c_{n,k}$ stored in the memory of the communication device that receives the data unit.

Following identification of the pilot sequence in the received data unit, the communication device that received the data unit (e.g., heap 14, the client station 25-1, or another suitable communication device) determines, based on the identified pilot sequence, a format of the received data unit. Finally, the communication device that received the data unit processes the received data unit according to the determined format of the data unit.

While example embodiments were described above in the context of data units that occupy a 20 MHz bandwidth, in other embodiments or scenarios, the data unit occupies a different suitable bandwidth, such as a 1 MHz, 2 MHz, 5 MHz, 10 MHz, 40 MHz, 80 MHz, 160 MHz, 320 MHz, 640 MHz, etc., for example, or other suitable bandwidths, in other embodiments. In other embodiments, the data unit includes 114, or 242, or 484, or other suitable number of subcarriers, and the pilot subcarriers are located at other subcarrier indices such as ±11, ±25, ±53, or at ±11, ±39, ±75, ±103, or at ±25, ±53, ±89, ±117, ±139, ±167, ±203, ±231, or at other suitable subcarrier indices.

Figure 11:
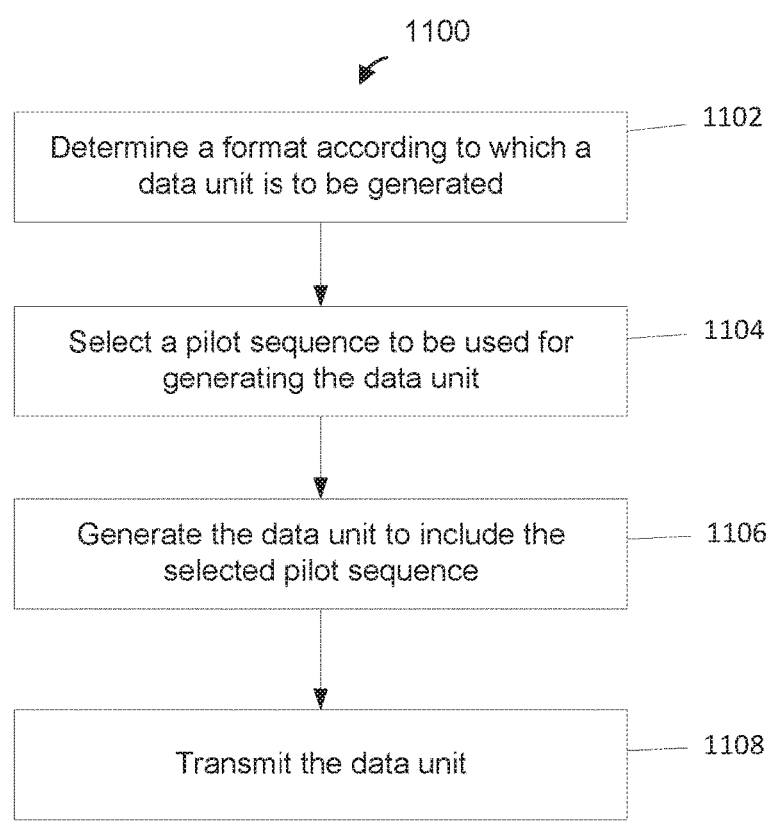
FIG. 11 is flow diagram of an example method for generating and transmitting a data unit having a pattern of pilot signals that indicates a format of the data unit, according to an embodiment.

FIG. 11 is a flow diagram of an example method 1100 for generating and transmitting a data unit that includes a selected pilot sequence, according to an embodiment. In an embodiment, the method 1100 is implemented by a communication device in a WLAN, according to an embodiment. With reference to FIG. 1, the method 1100 is implemented by the network interface 27, in an embodiment. For example, in one such embodiment, the PHY processor 29 is configured to implement at least a portion of the method 1100. According to another embodiment, the MAC processing 28 is also configured to implement at least a part of the method 1100. With continued reference to FIG. 1, in yet another embodiment, the method 1100 is implemented by the network interface 16 (e.g., the PHY processor 20 and/or the MAC processor 18). In other embodiments, the method 1100 is implemented by other suitable network interfaces.

At block 1102, a communication device determines a format according to which a data unit is to be generated. In some embodiments, a format is according to a first communication protocol. In other embodiments, a format is according to one of a plurality of formats defined by the first communication protocol. In some embodiments, the data unit to be generated is a PHY data unit (e.g., a PHY protocol data unit (PPDU)).

At block 1104, the communication device, based on the determined format to be used for generating the data unit, selects a pilot sequence to be used for generating the data unit. In an embodiment, a pilot sequence is selected from a plurality of pilot sequences corresponding to a plurality of data unit formats. In some embodiments, where a pilot sequence is generated according to a parameter $p_n c_{n,k} P_k$, e.g., as defined in Equation 2 or another suitable parameter, a sequence $c_{n,k}$ (e.g., such as in Equation 3 or Equation 4, or another suitable sequence) is selected. In some embodiments, a pilot sequence and/or sequence $c_{n,k}$ is selected from a plurality of sequences stored in a memory of the communication device.

More generally, in some embodiments, the communication device, based on the determined format to be used for generating the data unit, selects a pattern of pilot signals that are to be included in the data unit. In an embodiment, a pattern is selected from a plurality of patterns corresponding to a plurality of data unit formats.

At block 1106, the communication device generates the data unit to include the selected pilot sequence. In an embodiment, generating the data unit includes generating a PHY data unit with the selected pilot sequence modulating pilot subcarriers in one or more OFDM symbols. In some embodiments, generating a pilot sequence includes generating the pilot signals using the parameter $p_n c_{n,k} P_k$. More generally, in some embodiments, the communication device generates the data unit to include the selected pattern of pilot signals.

At block 1108, the communication device transmits the data unit including the selected pilot sequence.

Figure 12:
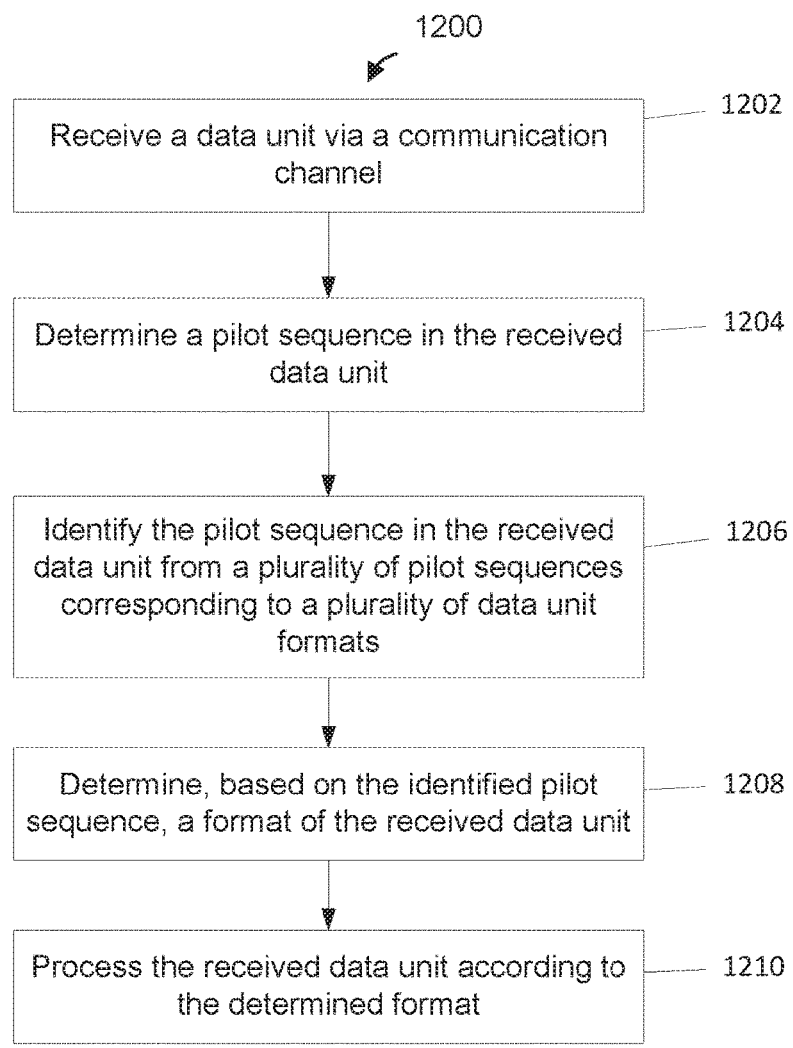
FIG. 12 is flow diagram of an example method for processing a data unit having a pattern of pilot signals that indicates a format of the data unit, according to an embodiment.

FIG. 12 is a flow diagram illustrating an example method 1200 for processing a received data unit, according to an embodiment. In an embodiment, the method 1200 is implemented by a communication device in a WLAN, according to an embodiment. With reference to FIG. 1, the method 1200 is implemented by the network interface 27, in an embodiment. For example, in one such embodiment, the PHY processor 29 is configured to implement at least a portion of the method 1200. According to another embodiment, the MAC processing 28 is also configured to implement at least a part of the method 1200. With continued reference to FIG. 1, in yet another embodiment, the method 1200 is implemented by the network interface 16 (e.g., the PHY processor 20 and/or the MAC processor 18). In other embodiments, the method 1200 is implemented by other suitable network interfaces.

At block 1202, a communication device receives a data unit via a communication channel. In some embodiments, the received data unit is a WLAN data unit.

At block 1204, the communication device determines a pilot sequence in the received data unit. In some embodiments, the determined pilot sequence is modulated by pilot subcarriers of in one or more OFDM symbols in the data unit.

At block 1206, the communication device identifies the pilot sequence of the received data unit from among a plurality of pilot sequences corresponding to a plurality of data unit formats. In some embodiments, at least some data unit formats in the plurality of data unit formats correspond to different communication protocols, and the identified pilot sequence indicates a communication protocol to which the data unit conforms. In some embodiments, at least some data unit formats in the plurality of data unit formats correspond to multiple data unit formats defined by a single communication protocol (e.g., the first communication protocol), and the identified pilot sequence indicates the data unit format, among the multiple data unit formats defined by the first communication protocol, to which the data unit conforms.

In some embodiments, identifying the pilot sequence includes identifying to which of multiple different parameters $p_n c_{n,k} P_k$ the pilot sequence in the received data unit corresponds. In some embodiments, identifying to which of multiple different parameters $p_n c_{n,k} P_k$ the pilot sequence in the received data unit corresponds includes identifying to which of multiple different sequences $c_{n,k}$ the pilot sequence in the received data unit corresponds. In some embodiments, the sequence $c_{n,k}$ corresponds to Equation 3 or Equation 4 (or to another suitable specification).

More generally, in some embodiments, the communication device determines a pattern of pilot signals in the data unit at block 1204, and identifies the determined pattern from among a plurality of pilot signal patterns corresponding to a plurality of data unit formats at block 1206.

At block 1208, the communication device determines, based on the identified pilot sequence, a format of the received data unit. More generally, in some embodiments, the communication device determines, based on the identified pattern of pilot signals, a format of the data unit.

At block 1210, the communication device, processes the received data unit according to the determined format of the received data unit. For example, in some embodiments, the different formats correspond to different PHY preamble formats having one or more of i) different fields, ii) different lengths of fields, iii) fields with different subfields, iv) different modulations of one or more fields, etc. Thus, in some embodiments, block 1210 includes processing the PHY preamble of the received data unit according to one or more of i) one or more fields specified by the determined format (e.g., at least some of the other formats do not include the one or more fields), ii) length(s) of one or more fields specified by the determined format (e.g., at least some of the other formats specified the field(s) to have different length(s)), iii) subfields of a field specified by the determined format (e.g., at least some of the other formats do not include the subfields and/or include other subfields that are omitted from the specified format), iv) a particular modulation or particular modulations of one or more fields (e.g., at least some of the other formats specify one or more fields to have modulation(s) different than those specified by the determined format), etc.

In some embodiments, techniques such as disclosed herein are combined with one or more techniques disclosed in U.S. patent application Ser. No. 15/017,385, filed on Feb. 5, 2016, entitled "Physical Layer Frame Format for WLAN," which is hereby incorporated by reference herein in its entirety. For example, U.S. Provisional Patent Application No. 62/218,309, which is incorporated herein by reference, discloses various embodiments in which multiple techniques for indicating a format of a data unit are combined so that a receiver of the data unit can determine the format of the data unit using one or more techniques.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting a data unit comprising a plurality of orthogonal frequency division multiplexing (OFDM) symbols, the method comprising:
   determining, at a communication device, a data unit format according to which a data unit is to be generated, the data unit format selected from a plurality of data unit formats;
   selecting, at the communication device, a pilot sequence to be used for generating the data unit, wherein
      the pilot sequence is selected from a plurality of pilot sequences corresponding to the plurality of data unit formats,
      the pilot sequence is selected based on the determined data unit format,
      selecting the pilot sequence includes selecting a parameter $c_{n,k}$ based on the data unit format,
      $c_{n,k}$ is a sequence for an n-th OFDM symbol, and
      k is an OFDM subcarrier index;
   generating, at the communication device, the data unit to include the selected pilot sequence modulated on one or more pilot subcarriers of one or more OFDM symbols of the plurality of OFDM symbols, wherein generating the data unit to include the selected pilot sequence comprises:
      generating one or more OFDM symbols of the plurality of OFDM symbols according to the sequence $c_{n,k}$, and
      generating the data unit to include the selected pilot sequence, modulated on one or more pilot subcarriers, in one or more OFDM symbols corresponding to one or more fields of a physical layer (PHY) preamble that are after a legacy signal field in the PHY preamble and before a training field in the PHY preamble; and
   transmitting, by the communication device, the data unit including the selected pilot sequence modulated on the one or more pilot subcarriers, wherein the selected pilot sequence modulated on the one or more pilot subcarriers signals to a receiving device the data unit format of the data unit.

2. The method of claim 1, wherein at least some of the plurality of data unit formats correspond to different communication protocols.

3. The method of claim 1, wherein at least some of the plurality of data unit formats correspond to different formats defined by a single communication protocol.

4. The method of claim 1, wherein generating the data unit includes generating the data unit to include the selected pilot sequence across multiple OFDM symbols in the plurality of OFDM symbols of the data unit.

5. The method of claim 1, wherein generating the data unit includes generating the data unit to include the selected pilot sequence in one OFDM symbol in the plurality of OFDM symbols of the data unit.

6. The method of claim 1, wherein generating the data unit to include the pilot sequence includes generating the one or more OFDM symbols with pilot signals, modulated on the one or more pilot subcarriers, having flipped polarities.

7. An apparatus, comprising:
   a network interface device having one or more integrated circuits (ICs) configured to:
      determine a data unit format according to which a data unit is to be generated, the data unit format selected from a plurality of data unit formats;
      select a pilot sequence to be used for generating the data unit, wherein the pilot sequence is selected from a plurality of pilot sequences corresponding to the plurality of data unit formats, the pilot sequence is selected based on the determined data unit format, selecting the pilot sequence includes selecting a parameter $c_{n,k}$, $c_{n,k}$ is a sequence for an n-th OFDM symbol, and k is an OFDM subcarrier index; and wherein the one or more ICs are further configured to:

generate the data unit to include the selected pilot sequence modulated on one or more pilot subcarriers of one or more orthogonal frequency division multiplexing (OFDM) symbols among a plurality of OFDM symbols of the data unit, wherein generating the data unit to include the selected pilot sequence comprises:

generating one or more OFDM symbols of the plurality of OFDM symbols according to the sequence $c_{n,k}$, and generating the data unit to include the selected pilot sequence, modulated on the one or more pilot subcarriers, in one or more fields of a physical layer (PHY) preamble that are after a legacy signal field in the PHY preamble and before a training field in the PHY preamble; and transmit the data unit including the selected pilot sequence modulated on the one or more pilot subcarriers, wherein the selected pilot sequence modulated on the one or more pilot subcarriers signals to a receiving device the data unit format of the data unit.

8. The apparatus of claim 7, wherein at least some of the plurality of data unit formats correspond to different communication protocols.

9. The apparatus of claim 7, wherein at least some of the plurality of data unit formats correspond to different formats defined by a single communication protocol.

10. The apparatus of claim 7, wherein the one or more ICs are configured to generate the data unit to include the selected pilot sequence across multiple OFDM symbols in the plurality of OFDM symbols of the data unit.

11. The apparatus of claim 7, wherein the one or more ICs are configured to generate the data unit to include the selected pilot sequence in one OFDM symbol in the plurality of OFDM symbols of the data unit.

12. The apparatus of claim 7, wherein the one or more ICs are configured to generate one or more OFDM symbols with pilot signals, modulated on the one or more pilot subcarriers, having flipped polarities.

13. A method, comprising:

receiving, at a communication device, a data unit via a communication channel, the data unit comprising a plurality of orthogonal frequency division multiplexing (OFDM) symbols;

determining, at the communication device, a pilot sequence modulated on one or more pilot subcarriers of one or more OFDM symbols of the plurality of OFDM symbols in the received data unit, wherein the pilot sequence is in one or more fields of a physical layer (PHY) preamble of the data unit, and wherein the one or more fields are after a legacy signal field in the PHY preamble and before a training field in the PHY preamble;

identifying, at the communication device, the pilot sequence, modulated on the one or more pilot subcarriers, in the received data unit from a plurality of pilot sequences corresponding to a plurality of data unit formats, wherein identifying the pilot sequence comprises identifying a sequence $c_{n,k}$, wherein n is an OFDM symbol index and k is an OFDM subcarrier index;

determining, at the communication device, a data unit format of the received data unit corresponding to the identified pilot sequence modulated on the one or more pilot subcarriers; and processing, at the communication device, the received data unit according to the determined data unit format.

14. The method of claim 13, wherein at least some of the plurality of data unit formats correspond to different communication protocols.

15. The method of claim 13, wherein at least some of the plurality of data unit formats correspond to different formats defined by a single communication protocol.

16. The method of claim 13, wherein identifying the pilot sequence in the received data unit includes identifying one or more OFDM symbols in the plurality of OFDM symbols of the received data unit with pilot signals, modulated on the one or more pilot subcarriers, that have flipped polarities.

17. An apparatus, comprising:

a network interface device having one or more integrated circuits (ICs) configured to:

receive a data unit via a communication channel, the data unit comprising a plurality of orthogonal frequency division multiplexing (OFDM) symbols, determine a pilot sequence modulated on one or more pilot subcarriers of one or more OFDM symbols of the plurality of OFDM symbols in the received data unit, wherein the pilot sequence is in one or more fields of a physical layer (PHY) preamble of the data unit, and wherein the one or more fields are after a legacy signal field in the PHY preamble and before a training field in the PHY preamble, identify the pilot sequence, modulated on the one or more pilot subcarriers, in the received data unit from a plurality of pilot sequences corresponding to a plurality of data unit formats, wherein identifying the pilot sequence comprises identifying a sequence $c_{n,k}$, wherein n is an OFDM symbol index and k is an OFDM subcarrier index, determine a data unit format of the received data unit corresponding to the identified pilot sequence modulated on the one or more pilot subcarriers, and process the received data unit according to the determined data unit format.

18. The apparatus of claim 17, wherein at least some of the plurality of data unit formats correspond to different communication protocols.

19. The apparatus of claim 17, wherein at least some of the plurality of data unit formats correspond to different formats defined by a single communication protocol.

20. The apparatus of claim 17, wherein the one or more ICs are configured to identify one or more OFDM symbols in the plurality of OFDM symbols of the received data unit with pilot signals, modulated on the one or more pilot subcarriers, that have flipped polarities.

* * * * *